(12) United States Patent
Penias et al.

(10) Patent No.: US 12,521,050 B2
(45) Date of Patent: Jan. 13, 2026

(54) DEVICES, SYSTEMS AND METHODS OF REMOTE DETERMINATION OF PHYSIOLOGICAL INDICES FOR A REMOTE POLYGRAPH TEST

(71) Applicant: VALID.IT EVALUATION SOLUTIONS LTD, Ramat Hashofet (IL)

(72) Inventors: Yossi Penias, Ramat Hashofet (IL); Royi Avital, Kiryat Yam (IL)

(73) Assignee: VALID.IT EVALUATION SOLUTIONS LTD., Ramat Hashofet (IL)

( * ) Notice: Subject to any disclaimer, the term of this patent is extended or adjusted under 35 U.S.C. 154(b) by 0 days.

(21) Appl. No.: 19/239,991

(22) Filed: Jun. 17, 2025

(65) Prior Publication Data

US 2025/0302352 A1 Oct. 2, 2025

Related U.S. Application Data

(63) Continuation of application No. PCT/IL2025/050128, filed on Feb. 6, 2025.
(Continued)

(51) Int. Cl.
*G06K 9/00* (2022.01)
*A61B 5/00* (2006.01)
(Continued)

(52) U.S. Cl.
CPC ............ *A61B 5/164* (2013.01); *A61B 5/0205* (2013.01); *A61B 5/165* (2013.01); *A61B 5/7278* (2013.01);
(Continued)

(58) Field of Classification Search
CPC ....... A61B 5/164; A61B 5/0205; A61B 5/165; A61B 5/7278; A61B 5/02416;
(Continued)

(56) References Cited

U.S. PATENT DOCUMENTS 7,831,061 B1 * 11/2010 Lubard ................ A61B 5/0059
382/100
8,663,108 B2 * 3/2014 O'Kane .................. A61B 5/015
600/307
(Continued)

FOREIGN PATENT DOCUMENTS

CN 114557685 B * 11/2023 ........... A61B 5/0077
CN 116982945 A * 11/2023 ......... A61B 5/02055
(Continued)

OTHER PUBLICATIONS

Wim Verkruysse et al; Remote plethysmographic imaging using ambient light; 2008 Optical Society of America.
(Continued)

*Primary Examiner* — Shervin K Nakhjavan
(74) *Attorney, Agent, or Firm* — PEARL COHEN ZEDEK LATZER BARATZ LLP

(57) ABSTRACT

A method of determining physiological indices for a remote polygraph test, which may include, using a computing device operating a processor: receiving a video of a face of a subject; based on the video, monitoring a plurality of physiological indices of the subject; and based on values of the monitored physiological indices and a physiological correlation between the monitored physiological indices, determining a plurality of corrected physiological indices, the corrected physiological indices having values that are consistent with each other to reflect a consistent physiological condition of the subject.

16 Claims, 6 Drawing Sheets

Related U.S. Application Data

(60) Provisional application No. 63/550,859, filed on Feb. 7, 2024.

(51) Int. Cl.

| | | |
|---|---|---|
| *A61B 5/0205* | (2006.01) | |
| *A61B 5/16* | (2006.01) | |
| *G06Q 50/26* | (2012.01) | |
| *G16H 50/30* | (2018.01) | |
| *A61B 5/024* | (2006.01) | |
| *A61B 5/08* | (2006.01) | |
| *A61B 5/1455* | (2006.01) | |

(52) U.S. Cl.
CPC ........... *G06Q 50/265* (2013.01); *G16H 50/30* (2018.01); *A61B 5/02416* (2013.01); *A61B 5/0816* (2013.01); *A61B 5/14551* (2013.01); *A61B 5/4266* (2013.01); *A61B 5/4803* (2013.01); *A61B 2576/02* (2013.01)

(58) Field of Classification Search
CPC . A61B 5/0816; A61B 5/14551; A61B 5/4266; A61B 5/4803; A61B 2576/02; G06Q 50/265; G16H 50/30
See application file for complete search history.

(56) References Cited

U.S. PATENT DOCUMENTS

| | | | | |
|---|---|---|---|---|
| 9,198,621 | B2* | 12/2015 | Fernstrom | A61B 5/1123 |
| 10,335,045 | B2* | 7/2019 | Sebe | G06V 10/56 |
| 10,349,885 | B2* | 7/2019 | He | A61B 5/742 |
| 10,517,521 | B2* | 12/2019 | El Kaliouby | A61B 5/0261 |
| 11,471,084 | B2* | 10/2022 | Rundo | A61B 5/0255 |
| 11,547,309 | B2* | 1/2023 | Fukuda | A61B 5/02416 |
| 11,954,862 | B2* | 4/2024 | Ren | G16H 30/40 |
| 12,004,859 | B2* | 6/2024 | Penias | G06V 40/176 |
| 12,327,642 | B2* | 6/2025 | Jaffar | A61B 5/02416 |
| 2008/0045847 | A1* | 2/2008 | Farag | A61B 5/0082 600/500 |
| 2017/0231490 | A1* | 8/2017 | Toth | G16H 40/63 600/558 |
| 2022/0336083 | A1* | 10/2022 | Goldstein | A61B 5/1118 |
| 2023/0098734 | A1* | 3/2023 | Fedorin | A61B 5/742 600/300 |
| 2023/0109763 | A1* | 4/2023 | Everman | G06N 7/01 600/408 |
| 2023/0277068 | A1* | 9/2023 | Siefkes | G06N 20/20 600/301 |
| 2024/0041334 | A1* | 2/2024 | Devani | A61B 5/1128 |
| 2024/0071386 | A1* | 2/2024 | Maizels | G10L 13/027 |
| 2024/0245315 | A1* | 7/2024 | Winter | A61B 5/0077 |
| 2024/0252087 | A1* | 8/2024 | Mendenhall | G16H 40/67 |

FOREIGN PATENT DOCUMENTS

| | | | | |
|---|---|---|---|---|
| JP | 2008023127 | | 2/2008 | |
| WO | WO-2023021970 A1 * | | 2/2023 | ............ A61B 5/022 |

OTHER PUBLICATIONS

Farah Bahmed et al; Relation between respiratory rate and heart rate - A comparative study; Original Research Article; DOI: 10.5958/2394-2126.00099.2; Indian Journal of Clinical Anatomy and Physiology, Oct.-Dec. 2016; 3(4): 436-439.

Idoia Badiola Aguirregomezcorta et al; Learning about reflective PPG for SpO2 determination using Machine Learning; Current Directions in Biomedical Engineering 2021; 7(2): 33-36.

Ming-Zher Poh et al; Non-contact, automated cardiac pulse measurements using video imaging and blind source separation; Optics Express 10762; vol. 18 No. 10, May 10, 2010.

Yu Sun et al; Noncontat imaging photoplethysmography to effectively access pulse rate variability; Journal of Biomedical Optics 18 (6), 061205, Jun. 2013.

* cited by examiner

DEVICES, SYSTEMS AND METHODS OF REMOTE DETERMINATION OF PHYSIOLOGICAL INDICES FOR A REMOTE POLYGRAPH TEST

CROSS-REFERENCE TO RELATED APPLICATIONS

This application is a continuation of PCT International Application No. PCT/IL2025/050128, International Filing Date Feb. 6, 2025, claiming the benefit of U.S. Provisional Patent Application No. 63/550,859, filed Feb. 7, 2024, which are hereby incorporated by reference.

FIELD OF THE INVENTION

The present invention relates to the field of remote determination of physiological indices, and more particularly, to remote determination of physiological indices for a remote polygraph test.

BACKGROUND OF THE INVENTION

Remote measurement of physiological indices, such as heart rate and respiratory rate, may be performed by capturing a video of a face of a subject and analyzing variations in time of skin color caused by blood volume changes. Video-based remote measurement of physiological indices may suffer from several limitations. For example, video-based remote measurement of physiological indices may be sensitive to motion artifacts caused by subject movements such as head tilts or facial expressions. These movements may introduce noise that can obscure or distort physiological signals, leading to inaccuracies in measurement of physiological indices. In another example, video-based remote measurement of physiological indices may be sensitive to environmental factors, such as variable lighting conditions, camera quality, and the subject's skin tone, all of which can lead to inaccuracies in measurement of physiological indices, which can be used in a remote polygraph test.

SUMMARY OF THE INVENTION

Some embodiments of the present invention may provide a method of determining physiological indices for a remote polygraph test, the method may include, using a computing device operating a processor: receiving a video of a face of a subject; based on the video, monitoring a plurality of physiological indices of the subject; and based on values of the monitored physiological indices and a physiological correlation between the monitored physiological indices, determining a plurality of corrected physiological indices, the corrected physiological indices having values that are consistent with each other to reflect a consistent physiological condition of the subject.

In some embodiments, the corrected physiological indices include corrected values of all of the monitored physiological indices.

In some embodiments, the corrected physiological indices including a first subset including corrected values of a first subset of the monitored physiological indices, and a second subset of non-corrected values of a second subset of the monitored physiological indices, the corrected values and the non-corrected values being consistent with each other.

In some embodiments, determining each of the plurality of corrected physiological indices based on the values of respective monitored physiological index of the plurality of monitored physiological indices.

In some embodiments, determining each of the plurality of corrected physiological indices based on the values of a subset of the monitored physiological indices of the plurality of monitored physiological indices.

In some embodiments, determining the plurality of corrected physiological indices based on confidence levels of the monitored physiological indices, each of the confidence levels being indicative of an accuracy of respective monitored physiological index of the plurality of monitored physiological indices.

In some embodiments, determining the confidence levels based on at least one of a pose of the face and lightning conditions in the video.

In some embodiments, the method includes, for each of a plurality of image frames of the video: based on a pose of the face in the respective image frame, determining whether or not the respective image frame is valid for the monitoring of the physiological indices; and if it is determined that the respective image frame is not valid, excluding the respective image frame from the analysis.

In some embodiments, the plurality of monitored physiological indices is selected from a group including: a heart rate, a respiratory rate, an oxygen saturation, a sweat level and a stress level of the subject.

In some embodiments, the monitoring of the plurality of physiological indices includes: detecting and tracking a selected region of the face in a plurality of image frames of the video; based on the tracking, generating a dataset including data values indicative of a variation in time of a color of pixels in the selected region; and based on the dataset, determining a heart rate, a respiratory rate and an oxygen saturation of the subject.

In some embodiments, the monitoring of the plurality of physiological indices includes: based on a dataset including data values indicative of a variation in time of a color of pixels in a selected region of the face, determining a heart rate spectrogram and a respiratory rate spectrogram; and based on the heart rate spectrogram and the respiratory rate spectrogram, determining an oxygen saturation of the subject.

In some embodiments, the monitoring of the plurality of physiological indices includes determining a sweat level of the face of the subject.

In some embodiments, the monitoring of the plurality of physiological indices includes: detecting and tracking a size of pores on the face in a plurality of image frames of the video; and based on a variation in time of the size of pores, determining a sweat level of the face of the subject.

In some embodiments, the monitoring of the plurality of physiological indices includes: determining a glint measure of the face in a plurality of image frames of the video; and based on a variation in time of the glint measure, determining a sweat level of the face of the subject.

In some embodiments, the monitoring of the plurality of physiological indices includes determining a stress level of the subject based on an audio including a voice of the subject and a sweat level of the subject.

In some embodiments, the method includes providing the corrected physiological indices as an input to a video verification system, wherein the video verification system to determine, based on the corrected physiological indices, whether the video is an original authentic video or a fake video.

In some embodiments, the method includes providing the corrected physiological indices as an input to a remote polygraph test system, wherein remote polygraph test system to determine, based on the corrected physiological indices, whether the subject in video is truthful or deceptive in their answers to the test questions.

Some embodiments of the present invention may include a computing device, which may include: a memory; and a processor configured to carry out the method described herein.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout. In the accompanying drawings.

Figure 1A:
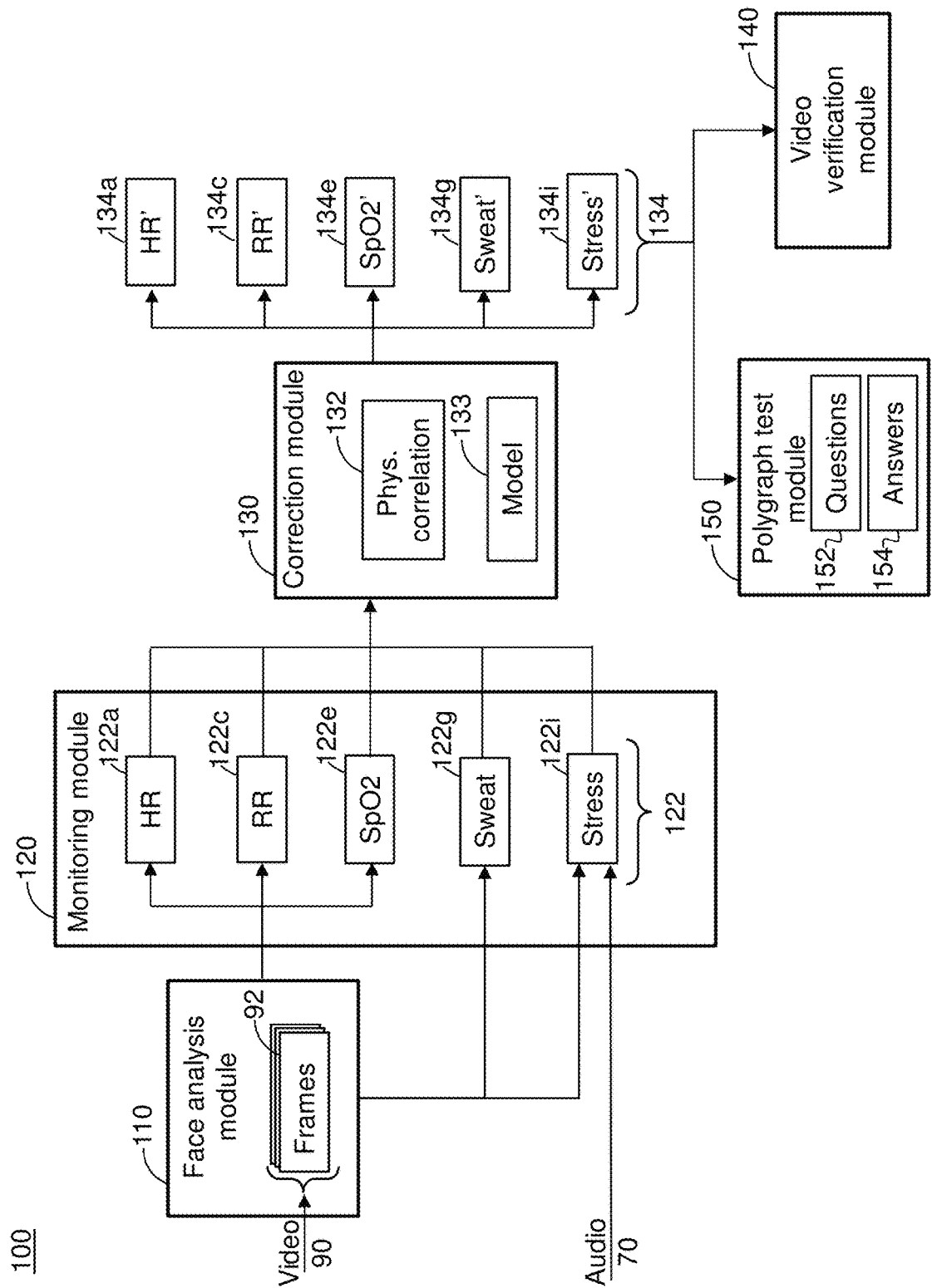
FIG. 1A is a block diagram of a system for remote determination of physiological indices, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the present invention may improve remote determination of physiological indices, for example determination of physiological indices based on a video of a face of a subject.

Embodiments of the present invention may include receiving a video of a face of a subject. Based on the video, a plurality of physiological indices (e.g., biomarkers and/or physiological parameters) of the subject may be monitored. The physiological indices may include a heart rate, a respiratory rate, an oxygen saturation, a sweat level and/or a stress level of the subject. In some embodiments, the monitored physiological indices may not be consistent with each other. For example, the monitored physiological indices, or at least a portion of the monitored indices, may contradict a physiological correlation between the physiological indices. In one example, the monitored heart rate may have a relatively high value while the monitored respiratory rate may have a relatively low value, which may contradict the physiological correlation between the heart rate and the respiratory rate. The inconsistency may be due to, for example, motion artifacts caused by subject movements such as head tilts or facial expressions in the video and/or the environmental factors such as lighting conditions. Based on values of the monitored physiological indices and the physiological correlation between the physiological indices, a plurality of corrected physiological indices may be determined. The corrected physiological indices may have values that are consistent with each other in a manner that reflects a consistent physiological condition of the subject. The values of the corrected physiological indices may correlate in a manner that reflects a consistent physiological condition of the subject. The values of the corrected physiological indices may not contradict each other in a manner that reflects the consistent physiological condition of the subject.

Embodiments of the present invention may improve the accuracy of the remote, e.g. video-based, determination of physiological indices as compared to prior art. The improvement of the accuracy may be achieved by correcting remotely monitored physiological indices to provide corrected physiological indices having values that correlate and/or not contradict each other to collectively reflect the consistent representation of the physiological condition of the subject. The determination of the corrected physiological indices may take into account various factors such as motion artifacts caused by subject movements and/or environmental factors such as lightning conditions.

The corrected physiological indices may be provided as an input to a remote polygraph test system. The remote polygraph test system may determine, based on the corrected physiological indices, whether or not the subject is truthful or deceptive in their answers to test questions. The corrected physiological indices may improve the performance of the remote polygraph test system.

Reference is made to FIG. 1A, which is a block diagram of a system 100 for remote determination of physiological indices (e.g. for a remote polygraph test), according to some embodiments of the invention.

System 100 may include a face analysis module 110. Face analysis module 110 may receive a video 90 of a face of a subject. Video 90 may include a plurality of time-sequential image frames 92. For each image frame 92, face analysis module 110 may: detect the face; detect face landmarks of the face; based on the face landmarks, determine a pose of the face; and based on the face landmarks and the pose, perform skin segmentation (e.g., identify skin regions) of the face in the respective image frame 92 (e.g. as described hereinbelow). For each image frame 92, based on the pose and possibly based on the face landmarks, face analysis module 110 may determine whether or not the respective image frame 92 is valid for monitoring (e.g. determining) of a plurality of physiological indices (e.g. as described hereinbelow).

System 100 may include a monitoring module 120. Based on image frames 92 of video 90 (e.g. at least based on image frames 92 determined as valid for monitoring of physiological indices), monitoring module 120 may monitor (e.g. determine) a plurality of physiological indices 122. Physiological indices 122 may include a heart rate 122a, a respiratory rate 122c, an oxygen saturation 122e and a sweat level 122g of the subject (e.g. as described herein below). Based on an audio 70 including a voice of the subject and sweat level 122g, monitoring module 120 may monitor (e.g. determine) a stress level 122i of the subject (e.g. as described hereinbelow).

System 100 may include a correction module 130. In some embodiments, monitored physiological indices 122, or at least a portion of monitored physiological indices 122, are not consistent with each other. For example, monitored physiological indices 122, or at least a portion of monitored physiological indices 122, may contradict a physiological correlation 132 between physiological indices 122. For example, relatively high monitored heart rate 122a (e.g. 120 beats per minute) and relatively low monitored respiratory rate 122c (e.g. 5 breaths per minute) may contradict physiological correlation 132 between the heart rate and the respiratory rate. The inconsistency in monitored physiological indices 122 may be due to, for example, motion artifacts caused by subject movements such as head tilts or facial expressions in video 90 and/or the environmental factors such as lighting conditions. Correction module 130 may correct monitored physiological indices 122 to provide corrected physiological indices 134, wherein corrected physiological indices 134 may have values that are consistent with each other, correlate with each other and/or not contradict each other in the manner that reflects the consistent physiological condition of the subject.

Physiological correlation 132 may include a dataset representing a proper correlation between the monitored physiological parameters that reflects the consistent (e.g. coherent) physiological condition of the subject. For example, heart rate 122a, respiratory rate 122c, oxygen saturation 122e, sweat level 122g and stress level 122i may correlate with each other, especially under stress or during exercise. Typically, as stress level 122i increases, heart rate 122a increases as well and the body needs more oxygen, which is reflected in a corresponding increase in respiratory rate 122c and oxygen saturation 122g, as well as in increased sweat level 122g to cool the body down. Physiological correlation 132 may express the correlation between the monitored physiological parameters 122 using, for example, mathematical models and/statistical models.

In some embodiments, correction module 130 corrects all monitored physiological indices 122 (e.g. as schematically shown in FIG. 1A). For example, corrected physiological indices 134 may include corrected values of all of monitored physiological indices 122. For each of monitored physiological indices 122, correction module 130 may determine a corrected physiological index of the respective monitored physiological index based on the values of monitored physiological indices 122 and physiological correlation 132 between monitored physiological indices 122. For example, a corrected heart rate 134a, a corrected respiratory rate 134c, a corrected oxygen saturation 134e, a corrected sweat level 134g and/or a corrected stress level 134i may be determined based on the values of monitored heart rate 122a, monitored respiratory rate 122c, monitored oxygen saturation 122e, monitored sweat level 122g and/or monitored stress level 122i and physiological correlation 132. Corrected heart rate 134a, corrected respiratory rate 134c, corrected oxygen saturation 134e, corrected sweat level 134g and/or corrected stress level 134i may have values that are consistent with each other, correlate with each other and/or not contradict each other in the manner that reflects the consistent physiological condition of the subject.

In some embodiments, correction module 130 corrects a subset of monitored physiological indices 122. For example, corrected physiological indices 134 may include a first subset of corrected values of a first subset of monitored physiological indices 122, and a second subset of non-corrected values of a second subset of monitored physiological indices 122. The corrected values and the non-corrected values may be consistent with each other, correlate with each other and/or not contradict each other in the manner that reflects the consistent physiological condition of the subject. The corrected value of each of the corrected physiological indices of the first subset may be determined by correction module 130 based on the values of monitored physiological indices 122 and physiological correlation 132 between monitored physiological indices 122 (e.g., as described herein). For example, monitored heart rate 122a and monitored respiratory rate 122b have values that may fit (or substantially fit) physiological correlation 132 between heart rate 122a and respiratory rate 122c, and monitored oxygen saturation 122e may have a value which may contradict physiological correlation 132 between oxygen saturation 122e and at least one of heart rate 122a and respiratory rate 122c. In this example, correction module 130 may determine corrected oxygen saturation 134e based on at least one of the value of monitored heart rate 122a and monitored respiratory rate 122b. Corrected oxygen saturation 134e, non-corrected monitored heart rate 122a and non-corrected monitored respiratory rate 122b may be consisted with each other, correlate to one another (e.g. fit physiological correlation 132) and/or not contradict each other in the manner that reflects the consistent physiological condition of the subject.

In some embodiments, correction module 130 determines each of corrected physiological index 134 based on the values of respective monitored physiological index of the plurality of monitored physiological indices 122. For example, if the value of the respective monitored physiological index is significantly different from other values (e.g. preceding or subsequent values) of the respective monitored physiological index (e.g. due to motion artifacts as described herein) and/or if the value is missing (e.g. due to invalidation of image frames 92 as described hereinbelow), correction module 130 may determine the respective corrected physiological index based on the values of the respective monitored physiological index, e.g. to fit the variation in time pattern of the respective physiological index.

In some embodiments, correction module 130 corrects monitored physiological indices 122 having values with greater deviation from physiological correlation 132 more aggressively than monitored physiological indices 122 having values with smaller deviation from physiological correlation 132. For example, if monitored oxygen saturation 134e has greater deviation from physiological correlation 132 than the deviation of monitored heart rate 122a, the value of monitored oxygen saturation 134e may be corrected more aggressively than the value of monitored heart rate 122a.

In some embodiments, correction module 130 corrects each of monitored physiological indices 122 based on the values of a subset of monitored physiological 122 (e.g. rather than based on the values of all monitored physiological indices 122). For example, each of the corrected physiological indices may be determined based on the values of the subset of monitored physiological indices 122 (e.g. rather than based on the values of all monitored physiological indices 122). In one example, correction module 130 may determine each of corrected heart rate 134a, corrected respiratory rate 134c and corrected oxygen saturation 134e based on values of monitored heart rate 122a, monitored respiratory rate 122c and monitored oxygen rate 122e (and not based on values of monitored sweat level 122g and monitored stress level 122i). In another example, correction module 130 may determine each of corrected sweat level 134g and corrected stress level 134i based on values of monitored sweat level 122g and monitored stress level 122i (and not based on values of monitored heart rate 122a, monitored respiratory rate 122c and monitored oxygen rate 122e). The subsets may be determined based on the measure of correlation of monitored physiological indices 122. For example, heat rate 122a, respiratory rate 122c and oxygen saturation 122e may strongly correlate with each other (e.g. stronger than with sweat level 122g and/or stress level 122i) and thus the values of monitored heart rate 122a, monitored respiratory rate 122c and monitored oxygen rate 122e may be used for determination of corrected heart rate 134a, corrected respiratory rate 134c and corrected oxygen saturation 134e. In another example, sweat level 122g and stress level 122i may strongly correlate with each other (e.g. stronger than with heat rate 122a, respiratory rate 122c and oxygen saturation 122e) and thus the values of monitored sweat level 122g and monitored stress level 122i be used for determination of corrected sweat level 134g and corrected stress level 134i.

In some embodiments, correction module 130 determines corrected physiological indices 134 based on confidence levels of monitored physiological indices 122. The confidence level of each of monitored physiological indices 122 may be indicative of an accuracy of the respective monitored physiological index. The confidence levels may be determined by face analysis module 110 based on, for example, the pose of face 80 in image frames 92 of video 90 and/or the environmental factor such as the lighting conditions in video 90. Monitored physiological indices 122 having higher confidence levels may be corrected by correction module 130 less aggressively than monitored physiological indices 122 having lower confidence levels.

Correction module 130 may include a model 133 that may correct monitored physiological indices 122 to provide corrected physiological indices 134 that are consisted with each other, correlate to one another (e.g. fit physiological correlation 132) and/or not contradict each other in the manner that reflects the consistent physiological condition of the subject.

In some embodiments, model 133 includes a Kalman filter, e.g. a multi-input Kalman filter. Model 133 may include a multi-layer Kalman filter, e.g. a multi-layer non-linear Kalman filter. At a first layer, the multi-layer Kalman filter may filter the values of each individual input signal (e.g. each monitored physiological index of monitored physiological indices 122) separately to remove noise, e.g. using a standard (e.g. multi-input) Kalman filter. This may include predicting the true signal state based on system dynamics, correcting the estimate or prediction using observed data, and tracking of uncertainty in the estimate or prediction.

At a second layer, the multi-layer Kalman filter may cross-reference the input signals (e.g. monitored physiological indices 122) to refine the estimates (e.g. corrected physiological indices 134) to leverage their correlations. This may include constructing a joint state vector that includes multiple input signals, update the estimates using information from correlated input signals, and apply a larger Kalman filter to the fused data, ensuring that input signals (e.g. corrected physiological indices 134) remain correlated through shared process and measurement models. The multi-layer Kalman filter may refine the estimates (e.g. corrected physiological indices 134) by applying multiple Kalman filtering stages to extract progressively more accurate estimates (e.g. corrected physiological indices 134). This may include applying smoothers such as Rauch-Tung-Striebel (RTS) smoothing, which improves the estimates by incorporating future observations and/or Adaptive covariance tuning where process noise and measurement noise may be dynamically adjusted.

Model 133 may include a post-processing L1 norm-based outlier resistant smoothing of the estimates (e.g. corrected physiological indices 134). Following the application of the multi-layer multi-input Kalman filter, model 133 may utilize L1 norm-based outlier resistant smoothing. The L1 norm may refine the estimated signals (e.g. corrected physiological indices 134), especially for outlier rejection, trend enhancement, and sparsity enforcement. By applying L1 norm post-processing, model 133 may suppress remaining outliers that were not fully corrected, preserve sharp transitions in the signals, enhance sparsity (e.g., if some corrections should be sparse rather than diffused), and/or reduce residual noise without introducing excessive smoothing. Application of the L1 norm may include a total variation denoising (TVD) which minimizes the sum of absolute differences between consecutive estimates, L1 Trend Filtering (e.g. Sparse Regression) which may filter occasional jumps in the signals with long periods of stability and/or Outlier Removal which may push the estimates toward the median instead of the mean to reduce outlier effects.

The hyperparameters of model 133 may be fine-tuned using an objective function, such as Bayesian Optimization. The fine-tuning process may involve adjusting the hyperparameters to achieve an optimal balance between absolute accuracy, which may refer to the precision of corrected physiological indices 134, and relative accuracy, which may pertain to the consistency of corrected physiological indices 134 across different measured physiological indices 122 and/or conditions. The objective function may be derived by a Bayesian Optimization, which may emphasize that changes in the biological sense have low frequencies and also prioritizing the loss being accurate relatively. The Bayesian Optimization may be particularly effective in this context as it efficiently explores the hyperparameter space by building a probabilistic model of the objective function, thereby identifying the best set of hyperparameters.

Examples of the output of model 133 are described below with respect to FIGS. 3A and 3B, which show graphs of corrected heart rate index determined according to some embodiments of the present invention.

System 100 may include a video verification module (e.g. sub-system) 140. Corrected physiological indices 134 may be provided as an input to video verification module 140. Based on corrected physiological indices 134, module 140 may determine whether video 90 is an authentic (e.g. original) real-time video or a fake video. For example, if the subject in video 90 is a computer-generated character and not a real person, physiological indices identified from video 90 may be unnatural (e.g. may contradict physiological patterns respective indices). Module 140 may determine whether corrected physiological indices 134 fit or contradict physiological patterns of respective physiological indices. If it is determined that corrected physiological indices 134 fit the physiological pattern of respective indices, module 140 may determine that video 90 is an original (e.g. authentic) video. If it is determined that corrected physiological indices 134 contradict the physiological pattern of respective indices, module 140 may determine that video 90 is a fake video.

If it is determined that video 90 is a fake video, module 140 may transmit a notification to an operator of system 100. The notification may alert the operator that video 90 is fake. Module 140 may terminate the operation of system 100 if it is determined that video 90 is fake.

System 100 may include a remote polygraph test module (e.g. sub-system) 150. Corrected physiological indices 134 may be provided as an input to module 150. Remote polygraph test module 150 may provide the subject with a plurality of test questions 152. Remote polygraph test 150 may receive answers 154 from the subject to test questions 152. Test questions 152 may be provided and answers 154 may be received during monitoring of physiological indices 122 by system 100. Based on corrected physiological indices 134 and answers 154 of the subject to test questions 152, module 150 may determine whether the subject in video 90 is truthful or deceptive in their answers 154 to test questions 152.

In some embodiments, it may be sufficient to determine and provide corrected heart rate 134a and corrected respiratory rate 132c as an input to remote polygraph test module 150 to determine whether the subject in video 90 is truthful or deceptive in their answers to test questions. However, monitoring and correcting additional physiological indices such as oxygen saturation 122e, 134e, sweat level 122g, 134g and/or stress level 122i, 134i may improve the correction and consistency of corrected physiological indices 134.

Figure 1B:
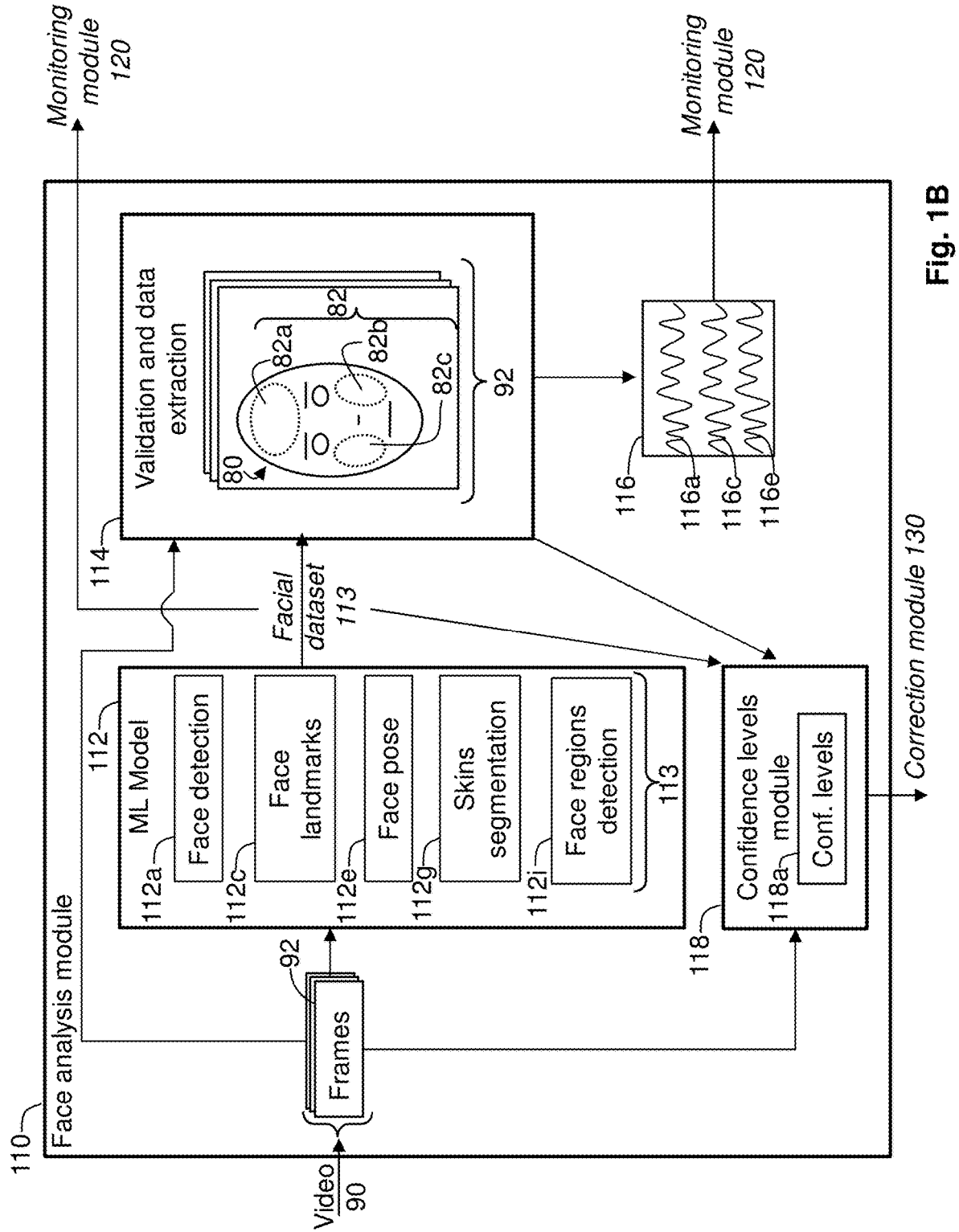
FIG. 1B is a block diagram of a face analysis module of the system for remote determination of physiological indices, according to some embodiments of the invention.

Reference is made to FIG. 1B, which is a block diagram of face analysis module 110 of system 100 for remote determination of physiological indices, according to some embodiments of the invention.

For each image frame 92 of video 90, face analysis module 110 may: detect a face 80; detect face landmarks of face 80; based on the face landmarks, determine a pose of face 80; based on the face landmarks and the pose, perform skin segmentation (e.g., identify skin regions); and based on the face landmarks and the skin segmentation, detect selected regions 82 of face 80 in respective image frame 92. Regions 82 may include regions of face 80 suitable for monitoring physiological indices such as a heart rate, a respiratory rate, an oxygen saturation and a sweat level of the subject. Regions 82 may include regions of face 80 in which blood vessels are disposed closer to the skin than in other regions of face 80. For example, regions 82 may include a forehead 82a, regions 82b, 82c on the sides of face 80 below the eyes and/or any other regions suitable for monitoring the physiological indices of the subject.

In some embodiments, face analysis module 110 includes a machine learning model 112. Model 112 may receive image frames 92 of video 90 as an input. For each of image frames 92, model 112 may perform: face detection 112a; face landmarks 112c detection; determination of face pose 112e; skin segmentation 112g; and face regions (e.g. regions 82) detection 112i (e.g. collectively referred to as a facial feature dataset 113). Model 112 may provide facial feature dataset 113 as an output.

Model 112 may be a neural network. Model 112 may involve a multi-task learning approach for face detection 112a, face landmarks detection 112c, pose detection 112e, skin segmentation 112g, and face regions detection 112i. This approach may allow model 112 to perform several related tasks simultaneously, leveraging shared representations to improve overall performance.

Model 112 may include an input layer that receives image frames 92, typically preprocessed to a standard size and normalized. These image frames may be fed into model 112 for analysis.

Model 112 may include convolutional layers, which may be responsible for extracting features from the input image frames. Model 112 may utilize depth-wise separable (e.g. spatially separable) convolutions. This type of convolution may reduce the number of parameters and computational cost by separating the spatial and channel-wise operations, making it particularly suitable for deployment on edge devices with limited resources (e.g. such as smartphones). Initial convolution layers of model 112 may include layers that may act as a shared feature extractor, learning representations that are useful for all tasks. This shared backbone is efficient and reduces redundancy, as the same features can be used for multiple tasks.

Model 112 may include task-specific heads. Model 112 may include a head responsible for identifying and localizing faces within the image frame. Model 112 may operate on a single scale and may not use anchors, simplifying the detection process and reducing computational complexity. Model 112 may include a face landmarks detection head focusing on detecting key facial landmarks, such as the eyes, nose, and mouth. This task benefits from the shared features extracted earlier, allowing for precise localization of landmarks. Model 112 may include a pose estimation head to estimate the orientation of the face in three-dimensional space. By leveraging the shared features, model 112 can accurately predict the pose, which is crucial for accurate monitoring of physiological indices 122. Model 112 may include a skin segmentation head tasked with segmenting the skin regions of the face. This may include classifying each pixel as either skin or non-skin. Model 112 may include a face regions detection head tasked detection selected regions (e.g. regions 82) on the face.

Model 112 may include an output layer that may provide the face detection, the face landmarks, the indication of the pose of the face, the skin segmentation and the face regions detection as an output.

Training data for training model 112 may include a plurality of training input datasets each including an image frame (e.g. such as image frames 92) labeled with a correct output indicating the presence or absence of the face in the image, the face landmarks, the pose of the face and skin segmentations masks of the face. The training input datasets may be then sequentially, one at a time, fed into model 112 which may calculate the predicted output. The calculated predicted output may be compared to the labeled correct output and a loss may be calculated using a loss function. Model 112 may employ a composite loss function that may integrate the objectives of all tasks. This multi-task loss function may allow model 112 to learn all tasks simultaneously, promoting faster convergence during training. Model 112 may achieve an Intersection over Union (IoU) of more than 75% for face detection and skin segmentation tasks, indicating high accuracy. The training input dataset may be then backpropagated through model 112 to calculate gradients of the loss using an optimization algorithm and update the weights of model 112. The training process may be repeated a plurality of times, each time with a different training input dataset of the plurality of training input datasets, for example until model 112 converges (e.g., until the loss stabilizes and/or the validation performance stops improving). The training data may include validation datasets that may be used for validation performance of model 112. The training data may include a test dataset for the final evaluation model 112. To optimize the performance of model 112, hyperparameters such as learning rate, batch size, relative weights of each loss and the architecture of the convolutional layers are fine-tuned using an objective function.

Model 112 may be specifically designed to run efficiently on edge devices, achieving more than 30 frames per second (FPS). This is facilitated by the reduced parameter count (approximately 150,000 parameters) and the use of depth-wise separable convolutions (e.g. as described above). This ensures that model 112 achieves a balance between accuracy and computational efficiency, making it suitable for real-time applications on edge devices (e.g. such as smartphones). Model 112 may extract only a sparse number of pixels from the face, ensuring that the subject cannot be identified from the extracted data, thus maintaining privacy.

Face analysis module 110 may include a validation and data extraction module 114.

For each of image frames 92, module 114 may determine whether or not the respective image frame is valid (e.g. suitable) for monitoring (e.g. determining) of physiological indices 122. The determination of whether or not the respective segmented image frame is valid for monitoring of the physiological indices may be based on face detection 112a, face pose 112e and/or face regions detection 112i determined for the respective image frame. For example, if the respective image frame includes the representation of face 80 and that face 80 is properly aligned (e.g. regions 82 are detectable in the respective image frame), module 114 may determine that the respective image frame is valid for monitoring of physiological indices 122. In another example, if the respective image frame does not include the representation of face 80 or if face 80 is not properly aligned (e.g. if regions 82 are not detectable due to face tilt and/or facial expression), module 114 may determine that the respective image frame is not valid for monitoring of physiological indices 112. Image frames 92 that are determined by module 114 as not valid for monitoring of the physiological indices may be excluded from further processing. Instead of using invalid image frames 92 for determination of monitored physiological indices 122, the values of respective monitored physiological indices 122 may be extrapolated based on preceding and/or subsequent values of respective monitored physiological indices 122 by correction module 130 when determining corrected physiological indices 134 (e.g. as described hereinabove).

Based on image frames 92 (e.g. at least image frames determined as valid for monitoring of physiological indices 122), module 114 may generate a color variation dataset 116 including data values indicative of a variation in time of a color (e.g. a red 116a, green 116c, blue 116e (RGB) values) of pixels in regions 82. Module 114 may track regions 82 in image frames 92 (e.g. based on face pose 112e determined for each of image frames 92) to ensure that the data values of color variation dataset 116 are extracted from same regions 82 over different (e.g. time-sequential) image frames 92. In this manner, motion artifacts caused by subject movements such as face 80 tilts or face 80 expressions may be reduced to a minimum.

Face analysis module 110 may transmit color variation dataset 116 and/or facial features dataset 113 including face detection 112a, face landmarks 112c, face pose 112e, and skin segmentation 112g determined for image frames 92 of video 90 to monitoring module 120.

Face analysis module 110 may include a confidence levels 118a determination module 118. Module 118 may determine confidence levels 118a of monitored physiological indices 122. The confidence level of each of monitored physiological indices 122 may be indicative of an accuracy of the respective monitored physiological index. Confidence levels 118a may be determined based on, for example, face pose 112e in image frames 92 and/or the environmental factor such as the lighting conditions in image frames 92. For example, if a region of regions 82 that is suitable for monitoring of a particular physiological index of physiological indices 122 is not detectable or partly detectable in image frames 92, the confidence level of the respective physiological index may be lower than the confidence levels of other physiological indices. Face analysis module 110 may transmit confidence levels 118a to correction module 130. Confidence levels 118a may be used by correction module 130 for determining corrected physiological indices 134 (e.g. as described hereinabove).

Figure 1C:
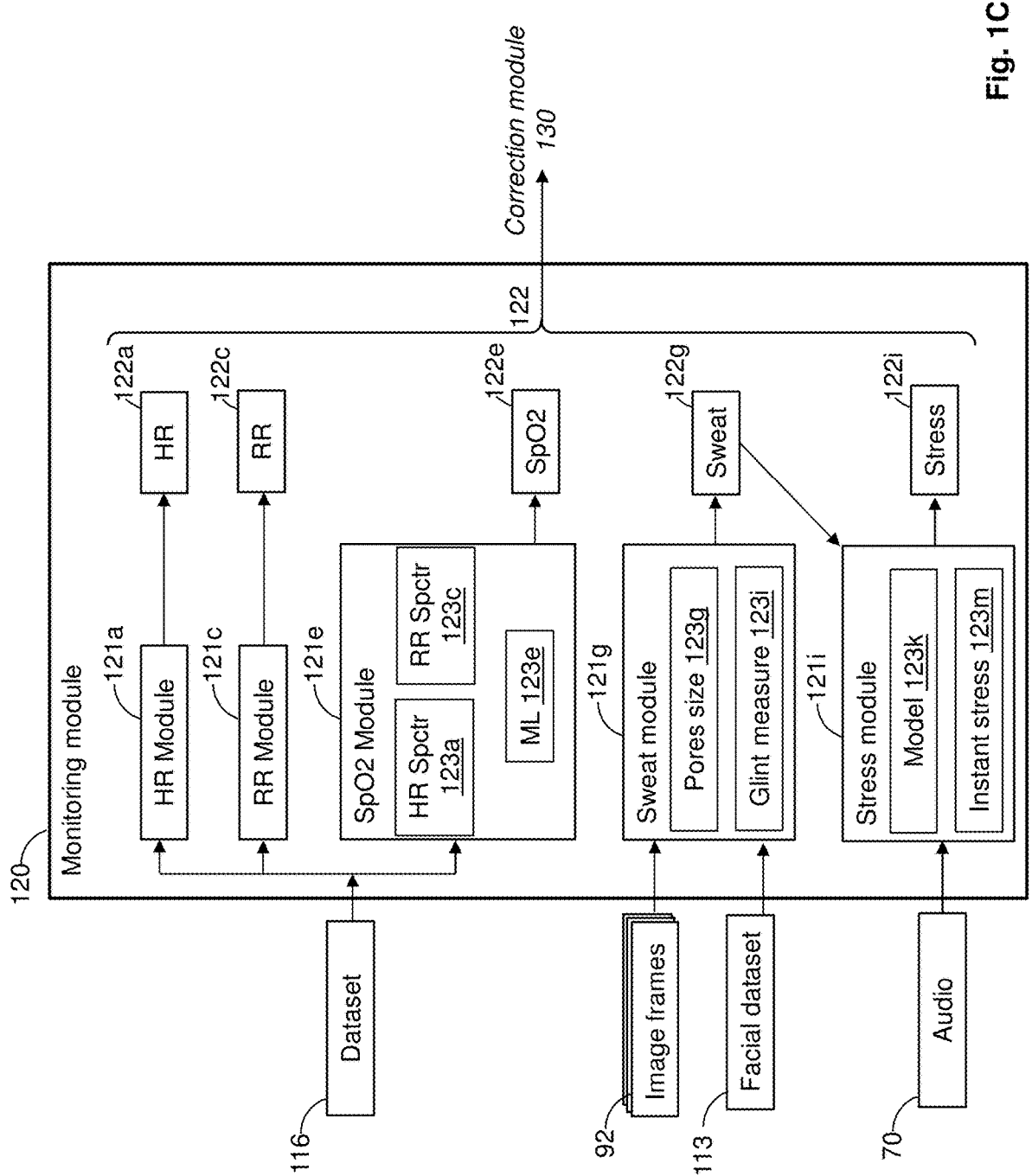
FIG. 1C is a block diagram of a monitoring module of the system for remote determination of physiological indices, according to some embodiments of the invention.

Reference is made to FIG. 1C, which is a block diagram of monitoring module 120 of system 100 for remote determination of physiological indices, according to some embodiments of the invention.

Monitoring module 120 may include a heart rate determination module 121a. Based on color variation dataset 116, module 121a may determine heart rate 122a of the subject. For example, a Time Frequency Transformation may be applied on the data values of color variation dataset 116 to determine frequencies (e.g. dominant frequencies) of the signals, wherein the determined frequencies are the instantaneous frequencies of heart rate 122a. In some embodiments, heart rate 122a is determined using a Photoplethysmogrammay (PPG) technique. In some embodiments, heart rate 122a is determined by:

$$\min_p \sum (|x_i(p) - y_i|)^1 + \lambda_1 \sum (|x_{i+1} - x_i|) + \lambda_2 \sum ((x_{i+1} - x_i) - (y_{i+1} - y_i))^2$$

wherein $x_i$ is the model estimation, $y_i$ is the ground truth measured by a reference instrument, $\lambda_1$ is the factor to control the smoothness of the estimation and $\lambda_2$ is the factor to control the significance of having an accurate relative change.

Monitoring module 120 may include a respiratory rate determination module 121c. Based on the data values of color variation dataset 116, module 121c may determine respiratory rate 122c of the subject. For example, a Time Frequency Transformation may be applied on the data values of color variation dataset 116 to determine frequencies (e.g. dominant frequencies) of the signals, wherein the determined frequencies are the instantaneous frequencies of respiratory rate 122c. In some embodiments, respiratory rate 122c is determined using the PPG technique.

Monitoring module 120 may include an oxygen saturation determination module 121e. Based on color variation dataset 116, module 121e may determine oxygen saturation 122e of the subject. In one example, based on color variation dataset 116, module 121e may determine a heart rate spectrogram 123a (which may include a visual representation of a heart rate frequency content over time) and a respiratory rate spectrogram 123c (which may include a visual representation of a respiratory rate frequency content over time). Spectrograms 123as, 123c may be determined using Fourier Transform (e.g. Short-Time Fourier Transform), Wavelet Transform and/or any other suitable transformations. Module 121e may include a machine learning model 123e that may receive heart rate spectrogram 123a and respiratory rate spectrogram 123c as an input, based on spectrograms 123a, 123c determine oxygen saturation 122e of the subject, and provide oxygen saturation 122e as an output.

In some embodiments, model 123e is a neural network. Model 123 may be a Computer Vision Convolutional Network model for performing a Time Frequency estimation. Model 123e may include an input layer that may receive heart rate spectrogram 123a and respiratory rate spectrogram 123c. Model 123e may include convolutional layers which may detect edges, textures, and patterns in the spectrogram 123a, 123c and capture important physiological patterns. Model 123e may include pooling layers which may reduce image dimensionality while preserving important features. Model 123e may include Fully Connected Layers (Dense Layers) which may predict oxygen saturation 122e, e.g. using Regression-Based Prediction.

Training data for training model 123e may include a plurality of training input datasets each including a sets of heart rate and respiratory rate spectrograms labeled with a correct output indicating the correct oxygen saturation value. The training input datasets may be then sequentially, one at a time, fed into model 123e which may calculate the predicted output. The calculated predicted output may be compared to the labeled correct output and a loss may be calculated using a loss function. The training input dataset may be then backpropagated through model 123e to calculate gradients of the loss using an optimization algorithm and update the weights of model 123e. The training process may be repeated a plurality of times, each time with a different training input dataset of the plurality of training input datasets, for example until model 123e converges (e.g., until the loss stabilizes and/or the validation performance stops improving). The training data may include validation datasets that may be used for validation performance of model 123e. The training data may include a test dataset for the final evaluation model 123e.

Monitoring module 120 may include a sweat level determination module 121g. Module 121g may determine sweat level 122g of the subject. For example, module 121g may determine three levels of sweat: low, medium and high; and/or any other suitable number of levels.

In some embodiments, module 121g determines sweat level 122g of the subject based on a variation in time of a size of pores of the skin of the subject. The determination of the variation in time of the size of the pores may be performed based on, for example, image frames 92 and/or skin segmentation 112f (e.g. and provided as part of facial features dataset 113). Module 121g may detect and track the size of the pores in the image frames 92 of video 90. For example, in each of image frames 92, each of pixels may include a value indicating a height of the respective pixel. Pixels with values that are lower than, e.g. a threshold, may represent the pores. The size of each of the pores may be determined by, for example, summing up the number of pixels representing the respective pore. By analyzing the variation in time of the size of the pores in image frames 92 (e.g. as indicated by "pores size 123g" in FIG. 1C), module 121g may determine sweat level 122g of the subject. For example, an increase of the size of the pores over time may indicate an increase of sweat level 122g of the subject. In another example, a decrease of the size of the pores over time may indicate a decrease of sweat level 122g of the subject.

In some embodiments, module 121g determines sweat level 122g of the subject based on a variation in time of a glint measure of the face of the subject. The determination of the variation in time of the glit measure of the face of the subject may be performed based on, for example, image frames 92 of video 90 (e.g. at least based on image frames 92 indicated as valid, as described hereinabove). By analyzing the variation in time of the glint measure of the face of the subject in image frames 92 (e.g. as indicated by "glint measure 123i" in FIG. 1C), module 121g may determine sweat level 122g of the subject. For example, an increase in the glint measure of the face of the subject over time may indicate an increase of sweat level 122g of the subject. In another example, a decrease in the glint measure of the face of the subject over time may indicate a decrease of sweat level 122g of the subject.

In some embodiments, sweat level determination module 121g determines sweat level 122g of the subject based on the variation in time of the size of the pores of the skin of the subject and the variation in time of the glint measure of the face of the subject.

Monitoring module 120 may include a stress level determination module 121i. Module 121i may determine stress level 122i of the subject. The determination of stress level 122i of the subject may be based on audio 70 including the voice of the subject and sweat level 122g of the subject. For example, stress level determination module 121i may determine three levels of stress 122i: low, medium and high; and/or any other suitable number of levels.

In some embodiments, stress level determination module 121i includes a machine learning model 123k to extract from audio 70 audio-specific features indicative of an instant stress level 123m of the subject. In one example, model 123k may include a transformer-based neural network. Model 123k may process audio 70 to extract distinctive features that correlate with an instant stress level of the subject. Model 123k may first convert raw audio 70 into a spectrogram capturing both temporal and frequency domain information. Using the self-attention mechanism, model 123k may identify important patterns in the frequency and time axes, such as subtle shifts or rhythms in the sound caused by changes in the physiological condition of the subject (e.g. stress). The multi-head attention layers may enable model 123k to focus on various aspects of the sound simultaneously, learning both short-range and long-range dependencies. Finally, model 123k predicts instant stress level 123m of the subject by mapping the extracted features to the target value through a regression head or classification layer.

Model 123k may be trained based on a training dataset including a plurality of audio recordings labeled with a physiological measurement (e.g. as heart rate) taken from the same subjects under controlled conditions. Different recordings may capture different subject-specific variations in the instant stress level. Audio data can be pre-processed into spectrograms to serve as input features, while the physiological measurement (e.g. as heart rate) may be used as a supervised label. Model 123k may be trained using this paired data to learn the relationship between the audio features and the physiological measurement (e.g. heart rate), optimizing using loss functions for continuous predictions or cross-entropy loss for classification tasks.

Module 121i may determine stress level 122i based on instant stress level 123m and sweat level 122g of the subject. The determination may be based on a correlation between instant stress level 123m in audio data 70 and the ongoing global stress level indicated by sweat level 122g of the body of the subject and, in particular, the face of the subject.

Figure 2:
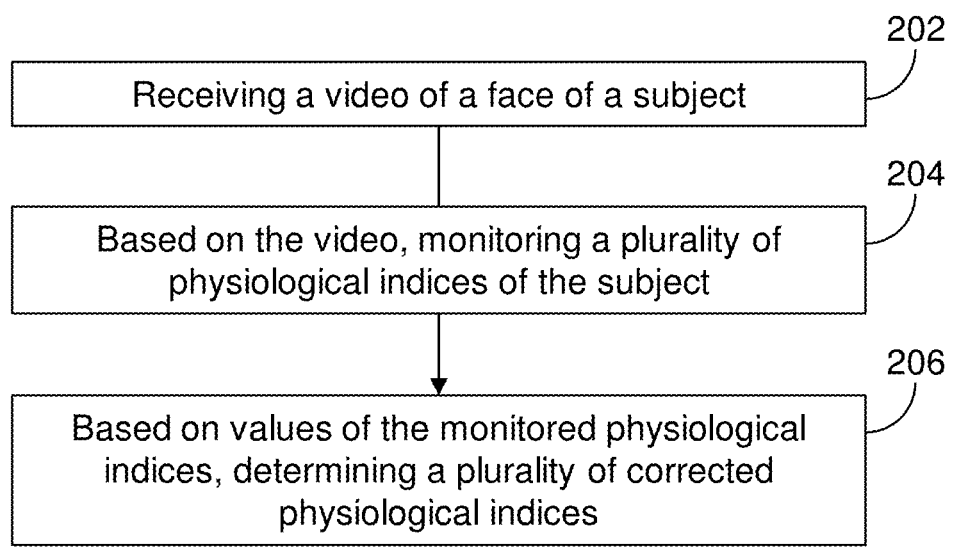
FIG. 2 is a flowchart of a method of remote determination of physiological indices, according to some embodiments of the invention.

Reference is made to FIG. 2, which is a flowchart of a method of remote determination of physiological indices, according to some embodiments of the invention.

The method may be performed using system 100 described hereinabove, computing device 400 described hereinbelow and/or any other suitable equipment.

In operation 202, a video (e.g. video 90) of a face of a subject may be received. The video may include a plurality of time-sequential image frames (e.g. image frames 92).

In operation 204, a plurality of physiological indices (e.g. physiological indices 122) may be monitored. The monitored physiological may include a heart rate, a respiratory rate, an oxygen saturation, a sweat level and/or a stress level of the subject. In some embodiments, the monitored physiological indices, or at least a portion of the monitored physiological indices, are not consistent with each other. For example, the monitored physiological indices, or at least a portion of the monitored physiological indices, may contradict a physiological correlation between the physiological indices (e.g. as described hereinabove). The inconsistency in the monitored physiological indices may be due to, for example, motion artifacts caused by subject movements such as head tilts or facial expressions in the video and/or the environmental factors such as lighting conditions.

In operation 206, based on values of the monitored physiological indices and a physiological correlation (e.g. physiological correlation 132) between the monitored physiological indices, a plurality of corrected physiological indices (e.g. corrected physiological indices 134) may be determined. The corrected physiological indices may have values that are consistent with each other (e.g. correlate with each other and/or not contradict each other) to reflect a consistent physiological condition of the subject (e.g. as described hereinabove).

In some embodiments, the corrected physiological indices include corrected values of all of the monitored physiological indices may be corrected (e.g. as described hereinabove). For each of the monitored physiological indices, a corrected physiological index of the respective monitored physiological index may be determined based on the values of the monitored physiological indices and the physiological correlation between the monitored physiological indices (e.g. as described hereinabove).

In some embodiments, the corrected physiological indices include corrected values of a subset of the monitored physiological indices (e.g. as described hereinabove). For example, the corrected physiological indices may include a first subset of corrected values of a first subset of the monitored physiological indices, and a second subset of non-corrected values of a second subset of the monitored physiological indices. The corrected values and the non-corrected values may have values may be consistent with each other, correlate with each other and/or not contradict each other in the manner that reflects the consistent physiological condition of the subject (e.g. as described hereinabove).

In some embodiments, each of the corrected physiological indices is determined based on the values of the respective monitored physiological index of the plurality of monitored physiological indices (e.g. as described hereinabove). For example, if the value of the respective monitored physiological index is significantly different from other values (e.g. preceding or subsequent values) of the respective monitored physiological index (e.g. due to motion artifacts as described herein), the respective corrected physiological index may be determined based on the values of the respective monitored physiological index, e.g. to fit the variation in time pattern of the respective physiological index.

In some embodiments, each of the corrected physiological indices is determined based on the values of a subset of the monitored physiological indices (e.g. rather than based on the values of all of the monitored physiological indices; e.g. as described hereinabove). The subset may be determined based on the measure of correlation of the monitored physiological indices of the subset (e.g. as described hereinabove).

In some embodiments, the corrected physiological indices are determined based on confidence levels (e.g. confidence levels 118a) of the monitored physiological indices (e.g. as described hereinabove). The confidence level of each of the monitored physiological indices may be indicative of an accuracy of the respective monitored physiological index. The confidence levels may be determined based on, for example, the pose of the face in the image frames of the video and/or the environmental factor such as the lighting conditions in the video (e.g. as described hereinabove).

In some embodiments, the corrected physiological indices are determined by providing the monitored physiological indices into a model (e.g. model 133), such as a multi-layer Kalman filter (e.g. as described hereinabove). The multi-layer Kalman filter may filter the values of each individual signal (e.g. each monitored physiological index of the monitored physiological indices) separately to remove noise, e.g. using a standard Kalman filter; cross-reference the signals (e.g. the monitored physiological indices) to refine the estimates (e.g. the corrected physiological indices) to leverage their correlations; and refine the estimates (e.g. the corrected physiological indices) by applying multiple Kalman filtering stages to extract progressively more accurate estimates (e.g. as described hereinabove). In some embodiments, the estimates (e.g. the corrected physiological indices) outputted by the multi-layer Kalman filter may be further post-processed by L1 norm-based smoothing to suppress remaining outliers that were not fully corrected, preserve sharp transitions in the signals, enhance sparsity (e.g., if some corrections should be sparse rather than diffused), and/or reduce residual noise without introducing excessive smoothing (e.g. as described hereinabove).

In some embodiments, e.g. prior to the monitoring of the physiological indices, for each of the image frames of the video: a face and face landmarks may be detected; based on the face landmarks, a pose of the face may be determined; and based on the face landmarks and the pose, a skin segmentation may be performed (e.g. as described hereinabove). This may be achieved by providing the respective image frame as an input to a machine learning model (e.g. such as model 112; e.g. as described hereinabove). The model may provide a facial feature dataset including the face detection, the face landmarks, the face pose, and the skin segmentation determined for the image frames of the video as an output.

In some embodiments, for each of the image frames of the video, based on the pose of the face, it may be determined whether or not the respective image frame is valid for the monitoring of the physiological indices (e.g. as described hereinabove). If it is determined that the respective image frame is not valid, the respective image frame may be excluded from the analysis (e.g. as described hereinabove).

In some embodiments, a selected region or regions (e.g. regions 82) of the face in the image frames of the video may be detected and tracked (e.g. as described hereinabove). The selected region or regions may include regions of the face suitable for monitoring of the physiological indices, such as a forehead, regions on the sides of the face below the eyes and/or any other regions suitable for monitoring the physiological indices of the subject. Based on the tracking, a color variation dataset (e.g. dataset 116) including data values indicative of a variation in time of a color of pixels in the selected region may be generated (e.g. as described hereinabove). Based on the dataset, a heart rate, a respiratory rate and an oxygen saturation of the subject may be determined (e.g. as described above).

In some embodiments, based on the color variation dataset, a heart rate and respiratory rate spectrograms (e.g. spectrograms 123a, 123c) may be determined (e.g. as described hereinabove). Based on the heart rate and respiratory rate spectrograms, an oxygen saturation of the subject may be determined (e.g. as described hereinabove). For example, the oxygen saturation may be determined by providing the heart rate and respiratory rate spectrograms as an input into a machine learning model (e.g. model 123e).

In some embodiments, the monitoring of the plurality of physiological indices includes determining a sweat level of the face of the subject (e.g. as described above). For example, a size of pores on the face may be detected and tracked in a plurality of image frames of the video (e.g. as described hereinabove). Based on a variation in time of the size of pores, a sweat level of the face of the subject may be determined (e.g. as described hereinabove). In another example, a glint measure of the face may be determined in a plurality of image frames of the video (e.g. as described hereinabove). Based on a variation in time of the glint measure, the sweat level of the face of the subject may be determined (e.g. as described hereinabove). In another example, the sweat level of the face of the subject may be determined based on the variation in time of the size of pores and the variation in time of the glint measure (e.g. as described hereinabove).

In some embodiments, the monitoring of the plurality of physiological indices includes determining a stress level of the subject. For example, the stress level may be determined based on an audio including a voice of the subject and a sweat level of the subject (e.g. as described above).

In some embodiments, the corrected physiological indices are provided as an input to a video verification system (e.g. video verification module 140). The video verification module may determine whether the video is an authentic (e.g. original) real-time video or a fake video based on the corrected physiological indices.

In some embodiments, the corrected physiological indices are provided as an input to a remote polygraph test system (e.g. remote polygraph test module 150). The remote polygraph test system may provide the subject with a plurality of test questions and receive answers from the subject to the test questions. Based on the corrected physiological indices and the answers of the subject to the test questions, the remote polygraph test module may determine whether the subject in video is truthful or deceptive in their answers to the test questions.

Figure 3A:
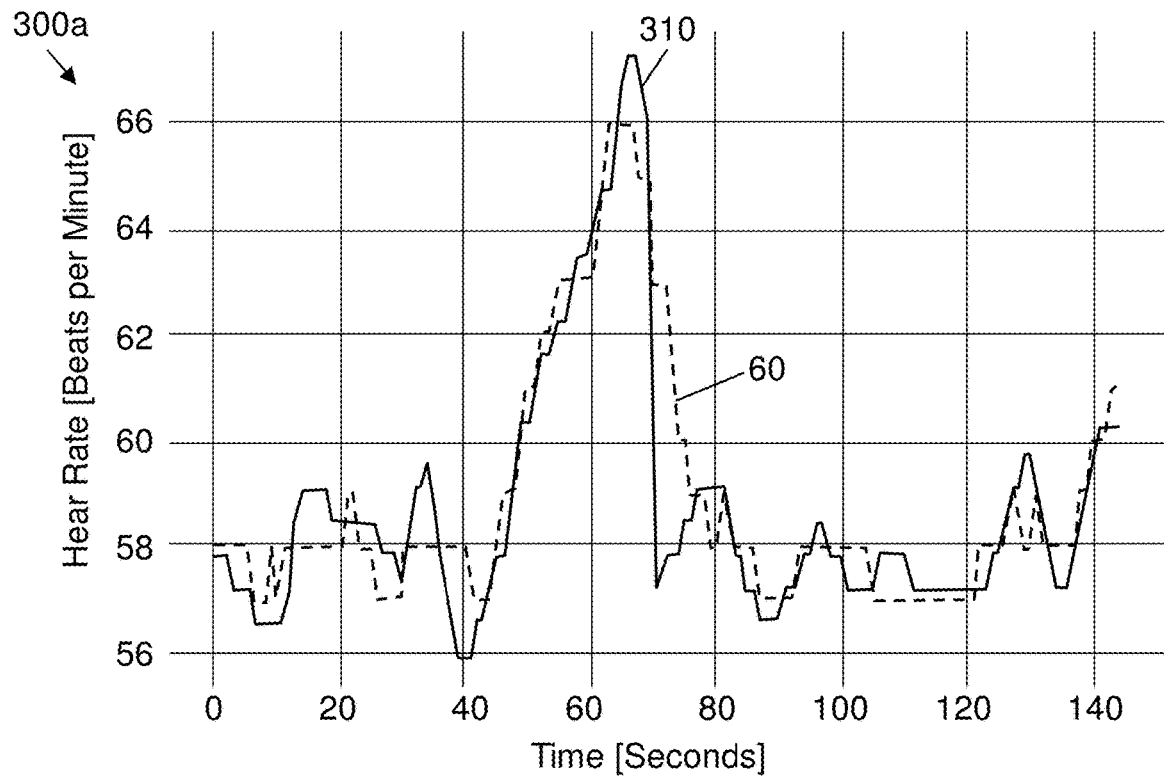
FIGS. 3A and 3B are graphs showing measured values of a heart rate of the subject and values of a corrected heart rate index determined according to some embodiments of the present invention.
Figure 3B:
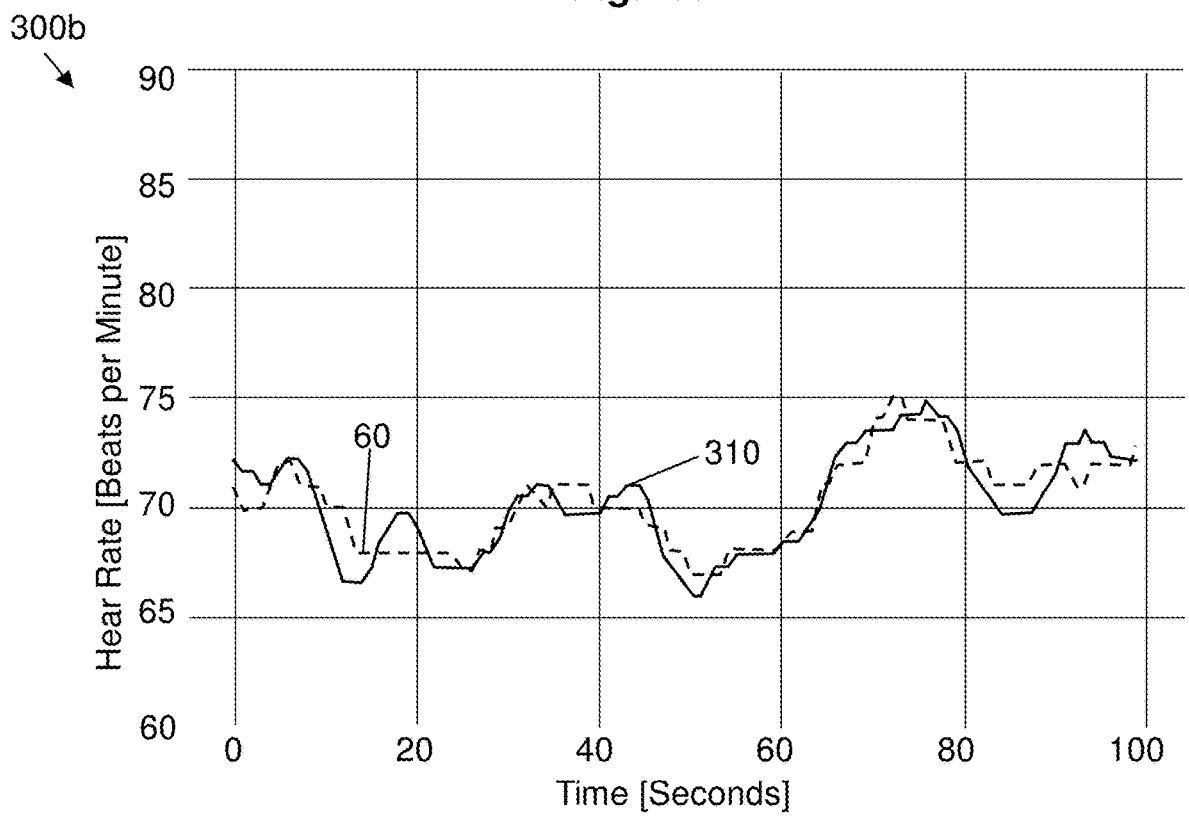

Reference is made to FIGS. 3A and 3B, which are graphs 300a, 300b showing measured values 60 of a heart rate of the subject and values 310 of a corrected heart rate index determined according to some embodiments of the present invention.

Measured values 60 of heart rate have been measured using a medical grade equipment. Values 310 of the corrected heart rate index have been determined according to embodiment of the present invention (e.g. as described hereinabove). FIGS. 3A and 3B show high correlation between measured values 60 and determined values 310 of the corrected heart rate index.

Figure 4:
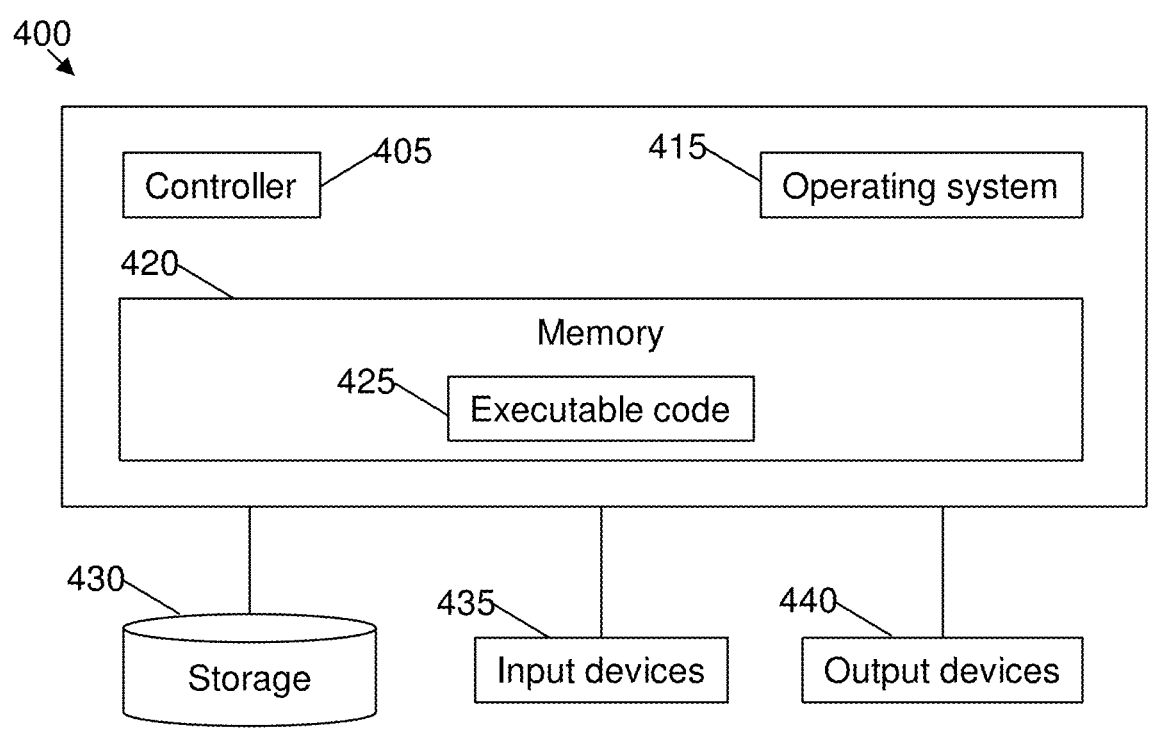
FIG. 4 is a block diagram of an exemplary computing device which may be used with embodiments of the present invention.

Reference is now made to FIG. 4, which is a block diagram of an exemplary computing device 400 which may be used with embodiments of the present invention.

Computing device 400 may include a controller or processor 405 that may be, for example, a central processing unit processor (CPU), a chip or any suitable computing or computational device, an operating system 415, a memory 420, a storage 430, input devices 435 and output devices 440.

Operating system 415 may be or may include any code segment designed and/or configured to perform tasks involving coordination, scheduling, arbitration, supervising, controlling or otherwise managing operation of computing device 400, for example, scheduling execution of programs. Memory 420 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 may be or may include a plurality of, possibly different, memory units. Memory 420 may store for example, instructions to carry out a method (e.g., code 425), and/or data such as user responses, interruptions, etc.

Executable code 425 may be any executable code, e.g., an application, a program, a process, task or script. Executable code 425 may be executed by controller 405 possibly under control of operating system 415. In some embodiments, more than one computing device 400 or components of device 400 may be used for multiple functions described herein. For the various modules and functions described herein, one or more computing devices 400 or components of computing device 400 may be used. Devices that include components similar or different to those included in computing device 400 may be used, and may be connected to a network and used as a system. One or more processor(s) 405 may be configured to carry out embodiments of the present invention by for example executing software or code. Storage 430 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 4 may be omitted.

Input devices 435 may be or may include a mouse, a keyboard, a touch screen or pad or any suitable input device. It will be recognized that any suitable number of input devices may be operatively connected to computing device 400 as shown by block 435. Output devices 440 may include one or more displays, speakers and/or any other suitable output devices. It will be recognized that any suitable number of output devices may be operatively connected to computing device 400 as shown by block 440. Any applicable input/output (I/O) devices may be connected to computing device 400, for example, a wired or wireless network interface card (NIC), a modem, printer or facsimile machine, a universal serial bus (USB) device or external hard drive may be included in input devices 435 and/or output devices 440.

Embodiments of the invention may include one or more article(s) (e.g., memory 420 or storage 430) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A method of determining physiological indices for a remote polygraph test, the method comprising, using a computing device operating a processor:
receiving a video of a face of a subject;
based on the video, monitoring a plurality of physiological indices of the subject; and
based on values of the monitored physiological indices and a physiological correlation between the monitored physiological indices, determining a plurality of corrected physiological indices, the corrected physiological indices having values that are consistent with each other to reflect a consistent physiological condition of the subject;
wherein the monitoring of the plurality of physiological indices comprises:
based on a dataset comprising data values indicative of a variation in time of a color of pixels in a selected region of the face, determining a heart rate spectrogram and a respiratory rate spectrogram; and
based on the heart rate spectrogram and the respiratory rate spectrogram, determining an oxygen saturation of the subject.

2. The method of claim 1, wherein the corrected physiological indices comprise corrected values of all of the monitored physiological indices.

3. The method of claim 1, comprising determining each of the plurality of corrected physiological indices based on the values of respective monitored physiological index of the plurality of monitored physiological indices.

4. The method of claim 1, comprising determining each of the plurality of corrected physiological indices based on the values of a subset of the monitored physiological indices of the plurality of monitored physiological indices.

5. The method of claim 1, comprising determining the plurality of corrected physiological indices based on confidence levels of the monitored physiological indices, each of the confidence levels being indicative of an accuracy of respective monitored physiological index of the plurality of monitored physiological indices.

6. The method of claim 5, comprising determining the confidence levels based on at least one of a pose of the face and lightning conditions in the video.

7. The method of claim 1, comprising, for each of a plurality of image frames of the video:
based on a pose of the face in the respective image frame, determining whether or not the respective image frame is valid for the monitoring of the physiological indices; and
if it is determined that the respective image frame is not valid, excluding the respective image frame from the analysis.

8. The method of claim 1, wherein the plurality of monitored physiological indices is selected from a group comprising: a heart rate, a respiratory rate, an oxygen saturation, a sweat level and a stress level of the subject.

9. The method of claim 1, wherein the monitoring of the plurality of physiological indices comprises:
detecting and tracking a selected region of the face in a plurality of image frames of the video;
based on the tracking, generating a dataset comprising data values indicative of a variation in time of a color of pixels in the selected region; and
based on the dataset, determining a heart rate, a respiratory rate and an oxygen saturation of the subject.

10. The method of claim 1, wherein the monitoring of the plurality of physiological indices comprises determining a sweat level of the face of the subject.

11. The method of claim 1, wherein the monitoring of the plurality of physiological indices comprises:
detecting and tracking a size of pores on the face in a plurality of image frames of the video; and
based on a variation in time of the size of pores, determining a sweat level of the face of the subject.

12. The method of claim 1, wherein the monitoring of the plurality of physiological indices comprises:
determining a glint measure of the face in a plurality of image frames of the video; and
based on a variation in time of the glint measure, determining a sweat level of the face of the subject.

13. The method of claim 1, wherein the monitoring of the plurality of physiological indices comprises determining a stress level of the subject based on an audio comprising a voice of the subject and a sweat level of the subject.

14. The method of claim 1, comprising providing the corrected physiological indices as an input to a video verification system, wherein the video verification system to determine, based on the corrected physiological indices, whether the video is an original authentic video or a fake video.

15. The method of claim 1, comprising providing the corrected physiological indices as an input to a remote polygraph test system, wherein remote polygraph test system comprises a processor to determine, based on the corrected physiological indices, whether the subject in video is truthful or deceptive in their answers to test questions.

16. A method of determining physiological indices for a remote polygraph test, the method comprising, using a computing device operating a processor:
- receiving a video of a face of a subject;
- based on the video, monitoring a plurality of physiological indices of the subject;
- based on values of the monitored physiological indices and a physiological correlation between the monitored physiological indices, determining a plurality of corrected physiological indices, the corrected physiological indices having values that are consistent with each other to reflect a consistent physiological condition of the subject; and
- providing the corrected physiological indices as an input to a remote polygraph test system, wherein remote polygraph test system comprises a processor to determine, based on the corrected physiological indices, whether the subject in video is truthful or deceptive in their answers to test questions;
- wherein the corrected physiological indices comprise a first subset comprising corrected values of a first subset of the monitored physiological indices, and a second subset of non-corrected values of a second subset of the monitored physiological indices, the corrected values and the non-corrected values being consistent with each other.

* * * * *